R. JUSTIS.
Churn.
No. 34,208.
Patented Jan. 21, 1862.
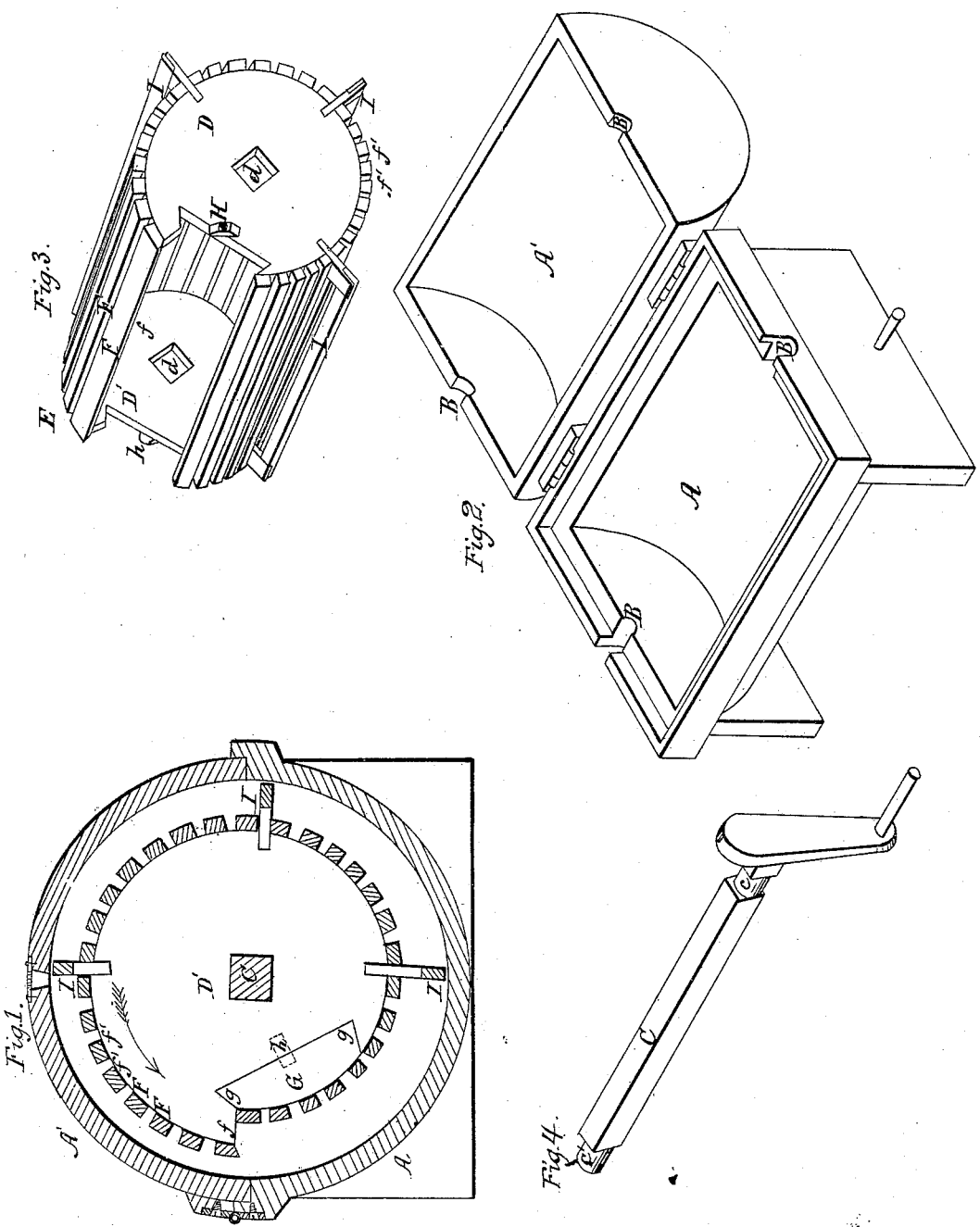

UNITED STATES PATENT OFFICE.

RANNAH JUSTIS, OF DUBLIN, INDIANA.

IMPROVEMENT IN CHURNS.

Specification forming part of Letters Patent No. 34,208, dated January 21, 1862.

*To all whom it may concern:*

Be it known that I, RANNAH JUSTIS, of Dublin, Wayne county, Indiana, have invented a new and useful Improvement in Churns; and I do hereby declare the following to be a full, clear, and exact description thereof, reference being had to the annexed drawings, making part of this specification.

Figure 1 is a vertical section of my churn in the plane of its rotation. Fig. 2 is a perspective view of the case. Fig. 3 is a perspective view of the dasher. Fig. 4 is a perspective view of the shaft.

The case A A' may have the form of a prism or have the represented cylindrical construction, its two halves parting at the horizontal plane of its axis and being hinged together, as shown. Half-round notches B in the edges of the parts A and A' afford bearings for the journals $c\ c'$ of a square shaft C, which occupies snugly square holes $d\ d'$ in the heads D D' of a horizontal open volute dasher E, whose periphery is composed of a series of slats F, which extend longitudinally from head to head, with interstices $f'$ between them. An opening $f$ at the conjunction of the largest and smallest portions of the volute forms an inlet for the milk, as hereinafter explained. A portion G of the dasher is made detachable, so as to form a door for removal of the butter and cleansing of the dasher, and is held shut by a button H and stop $h$ and dovetails $g$. Longitudinal wings I, which project beyond the periphery of the dasher, add their percussive action to that of the volute and case.

Operation: The shaft C and door G having been inserted in the dasher, the lower half of the case is to be nearly filled with milk. The dasher being now laid in its bearings and the case closed, the rotation of the dasher, as shown by the arrow, causes every portion of the milk to enter by turn the aperture $f$, and being by centrifugal action squirted through the interstices $f''$, impinges violently against the concave sides of the case, while the wings I act to beat that portion of the milk which is for the time being outside of the dasher. The butter, as it forms, is detained by and rolled around the concavity of the dasher, the buttermilk escaping through the interstices. The butter, when gathered, may be readily withdrawn through the doorway G.

When done with, the several parts C E G of the dasher are cleansed and laid by apart from each other until again needed.

I claim as new and of my invention—

The horizontal open volute dasher E, having door G, wings I, and detachable shaft C, as and for the purposes set forth.

In testimony of which invention I hereunto set my hand.

RANNAH JUSTIS.

Witnesses:
W. B. WILL,
JOHN N. LEEBRICK.